Nov. 29, 1966          C. A. SECKERSON         3,288,505
FASTENERS
Filed Jan. 28, 1964                                    2 Sheets-Sheet 1
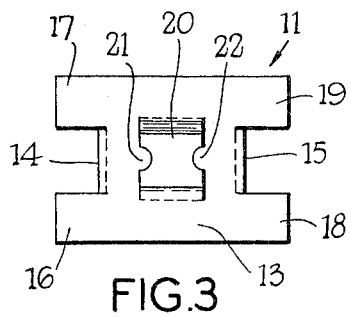
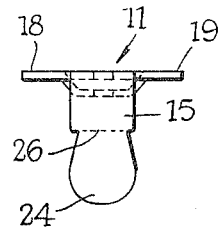
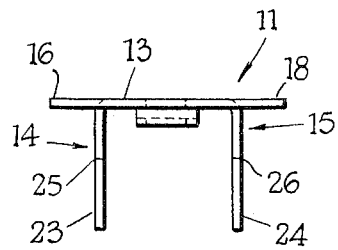
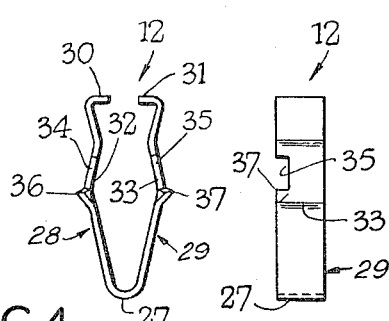
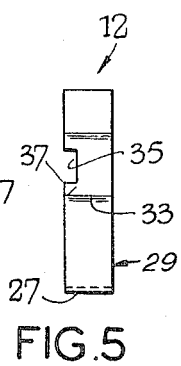
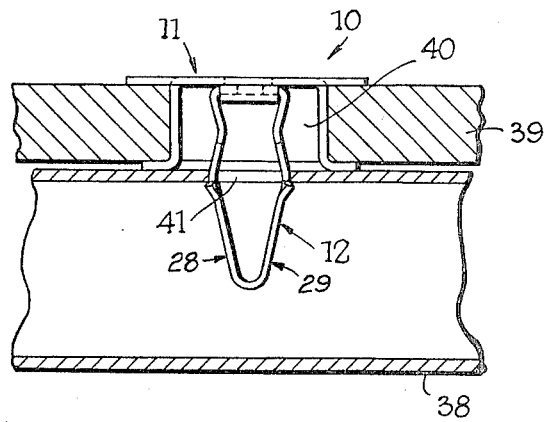
*INVENTOR*
*Clifford Alexander Seckerson*
by. *Walter S. Jones*
*Attorney.*

Nov. 29, 1966  C. A. SECKERSON  3,288,505
FASTENERS

Filed Jan. 28, 1964  2 Sheets-Sheet 2

INVENTOR
Clifford Alexander Seckerson
by Walter S. Jones
Attorney

United States Patent Office 3,288,505
Patented Nov. 29, 1966

3,288,505
FASTENERS
Clifford Alexander Seckerson, Iver Heath, England, assignor to United-Carr Incorporated, a corporation of Delaware
Filed Jan. 28, 1964, Ser. No. 340,732
Claims priority, application Great Britain, Feb. 1, 1963, 4,319/63
4 Claims. (Cl. 287—189.36)

The present invention relates to an improved two-part fastener which is particularly although not exclusively suitable for use in securing an apertured member such as a tube or pipe to an apertured panel.

According to the present invention there is provided a fastener for securing two members together comprising a resilient stud and a retainer, in which the resilient stud is in the form of an open loop having two limbs joined by a web, inwardly directed feet at the free ends of each limb and an outwardly directed elbow in each limb for snap-engagement through an aperture in one of the members to be secured, the retainer has a substantially flat body, a shelf formed by depressing the material between two cuts in the body out of the general plane of the body and means for attachment to the other member to be secured and the inwardly directed feet of the stud are slidably engaged behind the shelf of the retainer.

According to a further aspect of the invention there is provided a fastener as defined in the preceding paragraph and in which each limb has an outwardly directed lug lying substantially in the same plane as the inwardly directed feet and the outwardly directed lugs are adapted to bear against the body of the retainer to prevent the limbs being forced through the cuts in the body.

According to an alternative feature of the invention the cuts in the body of the retainer are rectilinear and inclined to one another.

According to yet a further aspect of the invention there is provided a fastener as defined in either preceding paragraph and in which the retainer is deformable and has two legs depending from the body substantially at right angles thereto and on either side of the stud.

Preferred forms of the invention will now be described with reference to the accompanying diagrammatic drawings in which:

FIGURES 1, 2 and 3 are respectively a side elevation, front elevation and plan view of a retainer forming one part of a two-part fastener according to the invention.

Figure 7:
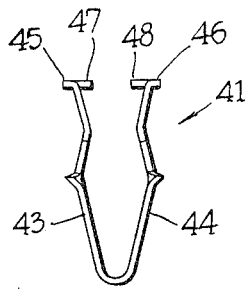
Figure 8:
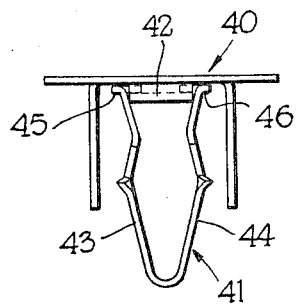
Figure 9:
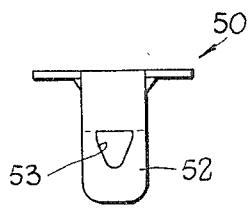

FIGURES 4 and 5 are respectively a side elevation and front elevation of a spring stud forming the other part of the two-part fastener, FIGURE 6 is a side elevation, partly in section showing a tube attached to a flat apertured panel with the aid of the two-part fastener of FIGURES 1 to 5, FIGURES 7 and 8 are side elevations showing respectively a modified spring stud and the modified spring stud assembled in a modified retainer, FIGURE 9 is a front elevation of a further modification of the retainer of FIGURES 1 to 3, and FIGURE 10 is a perspective view of a part of a further modification of the spring stud shown in FIGURE 7.

In FIGURES 1 to 6 there is shown a two-part fastener, which is indicated generally at 10 at FIGURE 6 and which comprises a retainer, indicated at 11 in FIGURES 1 to 3 and a spring stud, indicated at 12 in FIGURES 4 and 5.

Both the retainer 11 and the spring stud 12 are formed from a single strip of material such as steel and after being manufactured to the shape shown they are preferably rendered rustproof in any convenient manner.

The retainer 11 is deformable but the spring stud 12 is rendered resilient in any known and convenient manner.

The retainer 11 comprises a substantially flat body 13 and two generally parallel downwardly depending legs 14 and 15. The legs 14 and 15 are sheared partly from the body 13 which is thus approximately H-shaped and has a pair of lugs 16, 17 and 18, 19 respectively at each end thereof.

Two cuts are made in the material of the body and the material between the cuts is pressed out of the plane of the body to form a shelf 20 which lies to the same side of the body as the legs 14 and 15.

Each cut is formed with an indentation so as to make it non-rectilinear and the material within the identation in each cut constitutes a lip 21 and 22 respectively.

Each leg 14 and 15 is formed with a neck of reduced width intermediate its length which constitutes a line of weakness 26.

The resilient stud 12, shown in FIGURES 4 and 5 is in the shape of an open loop having a closed nose 27 and two limbs 28 and 29. The free end of each limb 28 and 29 is inwardly bent so as to constitute inwardly directed feet 30 and 31 in the same plane.

The limbs 28 and 29 are outwardly bent intermediate their length so as to be outwardly elbowed at 32 and 33 respectively.

A cut out 34 and 35 is provided in a side edge of each limb 28 and 29 respectively, adjacent the outwardly elbowed portions 32 and 33, and the material at a corner of each cut out is outwardly bent to form prongs 36 and 37 respectively.

If desired a cut out may be provided in both side edges of each limb 28 and 29 so as to form two outwardly directed prongs in each limb.

The two part fastener 10 is suitable for use as shown in FIGURE 6 in attaching a pipe 38 to a panel 39 formed with an aperture 40.

In order to make the assembly shown in FIGURE 6 the spring stud 12 is first attached to the retainer 11 by opening the limbs of the stud slightly and allowing the feet 30 and 31 to slide into engagement behind the shelf of the retainer.

The spring and retainer are then inserted into the aperture 40 in the panel so that the body 13 of the retainer is seated against the upper surface of the panel and the legs 23 and 24 of the retainer are then bent back against the under surface of the panel 39 so as to clench the rim of the aperture 40 to the body 13.

The pipe 38, which is formed with a hole 41 is then brought up to the under surface of the panel 39 and the outwardly elbowed limbs of the stud 12 are snap-engaged through the hole 41.

The nose 27 of the stud provides a good lead-in to the hole 41 and the prongs 36 and 37 are so positioned that they snap into the pipe 38 and engage behind the inner surface of the wall to retain the pipe firmly against the panel 39.

When the stud 12 is pressed nose first into the hole 41 the limbs 28 and 29 are forced upwardly and the feet bear against the lips 21 and 22 formed in the body 13 of the retainer. The lips 21 and 22 thus prevent the feet of the stud from working through the slots between the shelf 20 and body 13 and jamming as the stud is pressed home into the hole in the pipe.

A modification of the invention is shown in FIGURES 7 and 8 which illustrate a retainer 40 and spring stud 41.

The retainer 40 is similar to the retainer 11 of FIGURES 1 to 3 except that a shelf 42 is formed by displacing the material of the body of the retainer lying between two rectilinear parallel cuts in the body thus eliminating the lips 21 and 22 of the retainer 11.

The spring stud 41 is similar to the spring stud 12 of FIGURES 4 and 5 except that the free end of each limb 43 and 44 is outwardly bent to form a lug 45 and 46 respectively and an inwardly directed foot, 47 and 48 respectively, is sheared and bent from each limb so as to lie in the same plane as the lugs 45 and 46.

The retainer 40 and stud 41 may be used in the same manner as the retainer 11 and stud 12 to secure a pipe to a panel. In use the inwardly directed feet 47 and 48 of the spring are engaged behind the shelf 42 of the retainer and the outwardly directed lugs 45 and 46 bear against the undersurface of the body of the retainer so as to prevent the arms of the spring from being forced through and jammed in the retainer.

A further modification of the retainer 11 is indicated generally at 50 in FIGURE 9.

The retainer 50 is similar to the retainer 11 except that a line of weakness, indicated in broken line, in each leg 52 (only one of which is shown) is formed by providing an inverted triangular cut out 53 in each leg.

Figure 10:
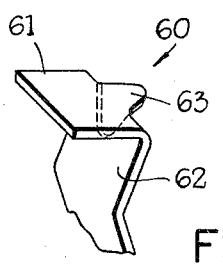

A part of a modification of the spring stud 41 described with reference to FIGURE 7 is indicated generally at 60 in FIGURE 10.

The stud 60 is similar to the stud 41 in every respect except that the free end of each limb 62 is inwardly bent to form a foot 61 and an outwardly directed lug 63 is sheared and bent from each limb so as to lie in approximately the same plane as the inwardly bent feet 61.

The stud 60 is used, in the same manner as the stud 41 with the retainer 40. When assembled in the retainer the inwardly directed feet 61 engage behind the shelf 42 and the outwardly directed lugs 63 bear against the underside of the body of the retainer to prevent the stud from being forced through the retainer and distorted or jammed.

What I claim is:

1. A two-part fastener for securing two members together comprising a resilient sheet metal stud and a sheet metal retainer, said stud being in the form of an open loop having two limbs joined by a web, inwardly directed feet at the free ends of each limb and an outwardly directed elbow in each limb for snap engagement through an aperture in one of the member to be secured, said retainer having a substantially flat body for engaging the upper surface of one of the member to be secured, a pair of legs depending from said body at substantially right angles thereto and having means for engaging the undersurface of the member and a shelf having opposed sides extending from said body in generally the same direction as said legs and a base spaced from said body and joining said sides, said stud being secured to said retainer by the snap engagement of said limbs and said feet with said shelf, said feet overlying the base of said shelf between said sides, at least one of said stud and said retainer having means to prevent the limbs of said stud from becoming jammed in said retainer when said stud is snapped into the aperture in one of the members to be secured.

2. A two-part fastener according to claim 1 wherein said last mentioned means comprises a pair of lips formed in the body portion of said retainer and overlying the base of said shelf in spaced relationship therewith.

3. A two-part fastener according to claim 1 wherein said last mentioned means comprises a pair of lugs lying generally in the plane of said feet and extending outwardly of said limbs and adapted to engage the undersurface of the body portion of said retainer.

4. A two-part fastener according to claim 1 wherein said last mentioned means comprises a pair of projections formed from material sheared from said feet and extending outwardly of said limbs.

References Cited by the Examiner
UNITED STATES PATENTS

| | | |
|---|---|---|
| 1,976,889 | 10/1934 | Place. |
| 2,197,419 | 4/1940 | Ross _____ 52—511 |
| 2,786,249 | 3/1957 | Poupitch _____ 189—35 X |

FOREIGN PATENTS 658,446   10/1951   Great Britain.

HARRISON R. MOSELEY, *Primary Examiner.*
REINALDO P. MACHADO, *Examiner.*
J. K. BELL, *Assistant Examiner.*